US011550149B2

(12) United States Patent
Hong et al.

(10) Patent No.: US 11,550,149 B2
(45) Date of Patent: Jan. 10, 2023

(54) HEAD UP DISPLAY SYSTEM

(71) Applicant: Continental Automotive Systems, Inc., Auburn Hills, MI (US)

(72) Inventors: Young Hong, Lake Orion, MI (US); Andreas Buechel, Sterling Heights, MI (US); Bogdan Marta, Rochester Hills, MI (US); Heather Knapp, Farmington Hills, MI (US)

(73) Assignee: Continental Automotive Systems, Inc., Auburn Hills, MI (US)

( * ) Notice: Subject to any disclaimer, the term of this patent is extended or adjusted under 35 U.S.C. 154(b) by 159 days.

(21) Appl. No.: 17/072,655

(22) Filed: Oct. 16, 2020

(65) Prior Publication Data
US 2022/0121026 A1 Apr. 21, 2022

(51) Int. Cl.
*G02B 27/01* (2006.01)
*G02B 5/02* (2006.01)
(Continued)

(52) U.S. Cl.
CPC ......... *G02B 27/0101* (2013.01); *G02B 5/003* (2013.01); *G02B 5/0273* (2013.01); *G02B 5/04* (2013.01)

(58) Field of Classification Search
CPC ............... G02B 27/01; G02B 27/0101; G02B 27/0103; G02B 27/0105; G02B 5/003;
(Continued)

(56) References Cited

U.S. PATENT DOCUMENTS 5,418,584 A * 5/1995 Larson ............... G02B 27/0172
353/38
6,392,812 B1 5/2002 Howard
(Continued)

FOREIGN PATENT DOCUMENTS

EP 0303742 A1 2/1989
KR 20170136807 A 12/2017

OTHER PUBLICATIONS

Kats Ikeda, PhD "The Ultimate Guide to Lens Design Forms: The types of optical systems in a lens designer's toolbox"; A Pencil of Rays; www.pencilofrays.com.
(Continued)

*Primary Examiner* — Sultan Chowdhury

(57) ABSTRACT

The present invention relates to a head up display system, in particular for a motor vehicle, comprising: a picture generating unit having a picture projection optics, a tilted mirror and an intermediate image plane, wherein light from the picture projection optics is deflected by the mirror toward the backside of the intermediate image plane, and an optical lens and/or mirror arrangement for magnifying and/or conveying a picture generated on the intermediate image plane to an optical combiner, wherein a pair of prisms is inserted in the optical path between the tilted mirror and the intermediate image plane to eliminate or mitigate specific light beams emanating from the intermediate image plane and traveling toward the tilted mirror and/or specific light beams emanating from the intermediate image plane already being reflected from the tilted mirror and traveling back toward the intermediate image plane.

18 Claims, 7 Drawing Sheets

(51) Int. Cl.
*G02B 5/00* (2006.01)
*G02B 5/04* (2006.01)

(58) Field of Classification Search
CPC .... G02B 5/0252; G02B 5/0273; G02B 5/021; G02B 5/02; G02B 5/04; G02B 5/08; G03H 1/16; G03H 1/2294
See application file for complete search history.

(56) References Cited

U.S. PATENT DOCUMENTS

| | | | |
|---|---|---|---|
| 6,886,971 B2 | 5/2005 | Abel et al. | |
| 9,448,427 B1 | 9/2016 | Pattikonda et al. | |
| 9,599,813 B1 | 3/2017 | Stratton et al. | |
| 2004/0100420 A1* | 5/2004 | Piehler | G02B 30/34 |
| | | | 340/425.5 |
| 2006/0290899 A1* | 12/2006 | Davis | G03B 21/28 |
| | | | 353/81 |
| 2011/0267702 A1 | 11/2011 | Fujimoto et al. | |
| 2016/0119595 A1* | 4/2016 | Lyubarsky | G02B 27/0961 |
| | | | 353/121 |
| 2018/0140196 A1 | 5/2018 | Khosravi Simchi et al. | |
| 2018/0246325 A1* | 8/2018 | Frisken | G03H 1/2205 |
| 2019/0079218 A1* | 3/2019 | Lee | G02B 5/0205 |
| 2020/0026077 A1* | 1/2020 | Christmas | G02B 5/1876 |

OTHER PUBLICATIONS

"DLP Technology: Enabling the Next Generation of Automotive Head-Up Display System"; Application Report DLPA043A—Oct. 2013—Revised Nov. 2017; Texas Instruments; Dallas, Texas ; www.ti.com.

"DLP Technology: Solving design challenges in next generation of automotive head-up display systems"; White Paper; DLPA057A—Dec. 2014—Revised Nov. 2917; Texas Instruments; Dallas, Texas; www.ti.com.

* cited by examiner

HEAD UP DISPLAY SYSTEM

BACKGROUND

Embodiments of the invention relate generally to a head up display system for overlaying a generated image on a scene.

It has proven to be very beneficial to project information directly into a driver's field of view by using the windshield as a screen for a display device installed in the dashboard panel. By this, the driver is less distracted and is able to continuously keep his eyes on the road.

In conventional head up display systems (abbreviated as HUD systems) the display device is placed in a recessed part of the dashboard panel, and is thereby concealed from the direct view of the vehicle operator.

An output light beam of the HUD system is reflected by the inner surface of the windshield at such an angle that the displayed image is seen by the vehicle driver, preferably in a manner as if the image were located at some distance ahead of the windshield.

However, in such a HUD system, external light, e.g. sunlight, entering the passenger compartment via the windshield may be reflected by components of the HUD system and reflect light into the vehicle driver's field of view. This may cause glare to the vehicle operator or otherwise prevent the vehicle operator paying attention to the road ahead of the vehicle.

In general, the optical system of a HUD system comprises of two distinct parts. One part to generate the image and one part to relay the image to the driver. The part generating the image is called "Picture Generating Unit" (PGU).

PGUs can be classified based on the way the image is generated. Direct-view PGUs generate the image directly on the surface observed by the driver, similar to a regular TV. Projection PGUs generate the image using a Spatial Light Modulator (SLM) and project it on a diffuse screen (i-plane or intermediate plane).

This screen is then observed by the driver, wherein the underlying principle is similar to a back-projection TV. The SLM can be a Digital Micro-mirror Device (DMD), Liquid Crystal Display (LCD), Liquid Crystal on Silicon (LCOS), or similar device.

The intermediate image created on the i-plane is observed by the driver through a magnifying optical system comprising at least one aspherical mirror throwing the magnified and typically also rotated intermediate image onto a combiner. The combining surface can be the vehicle windshield or a dedicated surface in the driver's line-of-sight. This optical system is being referred to as "HUD optics".

However, if sunlight hits the i-plane directly or via the HUD optics, there is a chance that a portion of the sunlight is reflected by the PGU mirror(s), back to the driver's eyes. The probability of occurrence and severity of these reflexes depends on the layout of the components in the PGU and HUD optics and the properties of the i-plane. The reflected sunlight can cause a substantial level of the glare into the driver's eye depending on the intensity of the reflex. As already mentioned, glare can be annoying or even dangerous to the driver.

The common solutions of this glare problem are tilting the PGU mirror(s) in such a way that the glare is avoided and/or reducing the size of optical components so that the glare is avoided.

Reducing the size of optical components typically means reducing the performance of the HUD, specifically the perceived image size and/or the size of the area from which the image can be seen. Further, predicting glare conditions during the design phase of a HUD within a vehicle is time-consuming and imprecise. Especially the properties of the i-plane are often not known at that point of time. Using the described methods to address a glare found after the design phase of the HUD can be a big effort, impacting timing and commercial viability of a project.

BRIEF SUMMARY

In view of such problems known from the prior art, a primary object of the present invention is to provide a HUD system that can prevent external light, like sunlight, reflected by an element of the HUD system from reaching the vehicle operator's view without substantially diminishing the intensity of the display light.

The invention enables eliminating or significantly reducing glare without changing the position or size of optical components even in case the design phase of the HUD system has already been completed and the arrangement position within a vehicle has already been set.

According to the present invention such objects can be obtained by providing a head up display system, in particular for a motor vehicle, comprising a picture generating unit (PGU) having picture projection optics, a tilted mirror and an intermediate image plane, wherein light from the picture projection optics is deflected by the mirror toward the backside of the intermediate image plane, and an optical lens arrangement for conveying a picture generated on the intermediate image plane to an optical combiner, wherein a pair of prisms is arranged in the optical path between the tilted mirror and the intermediate image plane to eliminate or mitigate undesired light beams emanating from the intermediate image plane and traveling toward the tilted mirror and/or undesired light beams emanating from the intermediate image plane that have already been reflected by the tilted mirror and are traveling back toward the intermediate image plane.

According to an aspect of the invention, the pair of prisms is arranged in the optical path between the tilted mirror and the intermediate image plane to eliminate or mitigate undesired light beams emanating from the intermediate image plane and traveling toward the tilted mirror and undesired light beams emanating from the intermediate image plane that have already been reflected by the tilted mirror and are traveling back toward the intermediate image plane.

Alternatively, the pair of prisms is arranged in the optical path between the tilted mirror and the intermediate image plane to eliminate or mitigate undesired light beams emanating from the intermediate image plane and traveling toward the tilted mirror or undesired light beams emanating from the intermediate image plane that have already been reflected by the tilted mirror and are traveling back toward the intermediate image plane.

The undesired light beams are, for example, light beams from sunlight that can cause glare.

The pair of prisms is preferably arranged in the optical beam path between a point of entry of light into the HUD system and a driver's eyes. In particular, a pair of prisms is preferably arranged between a tilted mirror and an intermediate image plane of the HUD system and/or between the image plane and the optical combiner.

In a head up display system according to the present invention, the vast majority of undesired sunlight reaching the intermediate image plane is removed by the pair of prisms, either when the light beams travel from the intermediate image plane to the tilted mirror or, after the light beams have already been reflected by the tilted mirror and travel from the tilted mirror towards the intermediate image plane.

The pair of prisms allows rays to pass the pair of prisms that have an incident angle lying in an expected range. The expected range of incident angles depends on the overall setting of the HUD system.

If an incoming ray hits the pair of prisms or any one of the prisms of the pair of prisms at an angle of incidence significantly different to the expected angle of incidence, the pair of prisms eliminates such a ray by means of total reflection. Thus, the pair of prisms functions as a filter allowing only rays to pass that have a desired or expected angle of incidence.

The pair of prisms thus reduces or diminishes the probability of glare by sunlight or other sources of external light reflected by a tilted mirror arranged upstream in the beam path ahead of the intermediate image plane of a HUD system. Undesired light, for example sunlight, is absorbed by the pair of prisms, e.g. by guiding the light beams to a blacked surface.

According to an embodiment of the present invention, each prism of the pair of prisms is a total internal reflection prism, a so called TIR prism.

In such a TIR prism, rays having entered the prism are reflected on the outgoing prism-air border in their entirety if the angle of incidence of a ray at the prism-air border exceeds the so called 'critical angle'. The skilled person is well aware of prisms and their ability of total internal reflection based on the fundamentals of Snell's law.

Total internal reflection occurs only if light travels from a medium of a high index of refraction (e.g. the prism) to a medium of a low index of refraction (e.g. air). For example, when light travels from medium 1 having an index of refraction $n_1$ into medium 2 having an index of refraction $n_2$ and let the indexes of refraction be $n_1>n_2$, then the critical angle $\theta_c$ is given by $\sin \theta_c=n_2/n_1$. For angles greater than the critical angle the incident light is totally reflected, obeying the law of reflection.

By arranging the TIR prism pair between the intermediate image plane and the tilted mirror, with the specific prism angles and the orientation of the TIR prism pair with respect to the intermediate image plane and the mirror, the light (sunlight) causing glare reflected by the mirror can be removed or significantly reduced. Drivers of a vehicle thus experience no glare or substantially reduced glare from the PGU side and enjoy better visibility of the virtual image of the HUD and increased safety against sunlight glare.

The TIR pair separates the desired light from the picture projection optics propagating toward the intermediate image plane from the undesired glare-causing light reflected by the tilted mirror and directs the desired light beams to the intermediate image plane while directing the undesired sunlight reflected by the mirror to absorption surfaces to remove the glare or reduce it significantly.

Thus, in case undesired rays from an external light source are entering the optical lens arrangement, reach the intermediate image plane and further propagate towards the tilted mirror, there is a high chance that these rays are deflected by total internal reflection of the pair of prisms and thus removed.

However, in case a ray successfully crosses the pair prisms once and thus reaches the tilted mirror, it is reflected towards the intermediate image plane and needs to cross the pair of prisms once again. Again, such a ray is only allowed through the prism arrangement if the angle of incidence lies in the expected range and thus is similar the angle of incidence of a desired ray originating from the picture projection optics and being deflected by the tilted mirror. Thus, the pair of prisms serves as a two-way filter and hence the almost all undesired rays originating from an external light source such as the sun are filtered out when crossing the pair of prisms twice.

For the above functions and operation of the TIR prism pair, the prism angle and the orientation of the TIR prism pair with respect to the intermediate image plane and the tilted mirror(s) are determined based on the TIR conditions of the TIR prism pair, including the critical angle corresponding to the index of the refraction of the prism pair.

Preferably, according to an optional modification of the invention, each one of the prisms is a triangular prism, a wedge-formed prism or a right angle prism. Thus, the base of the prisms can have a triangular shape, a right-angled shape or the prism can be wedge-shaped.

Preferably, the slanted surfaces of the prisms forming the pair of prisms are facing each other. There can be a small air gap between the surfaces of the prisms facing each other.

Further, if wedge-shaped prisms are used, the prisms can be arranged so that the thin end of a first prism of the pair of prisms is located in proximity to the thick end of the second prism of the pair of prims.

According to a certain aspect of the invention, the surfaces of the two prisms facing each other are separated from each other by an air gap that preferably is smaller than 1 mm, preferably smaller than 0.2 mm. According to a preferred embodiment of the invention, the air gap is 0.1 mm.

Additionally, the surfaces of the two prisms facing away from each other can be arranged to be parallel to each other.

Further, the prisms of the pair of prisms can be formed identical to each other.

According to a certain aspect of the present invention, a surface side of one prism of the pair of prisms or of each prism of the pair of prisms is blackened to serve as an absorption surface.

For example, a surface side defining the thickness of the prism is blackened to absorb total internal reflection light, in particular, wherein the surface side is a side opposite to the angle defining the slope of a wedge-formed or right-angled prism or the side parallel thereto.

For example, in a prism of the prism pair, the surface side opposite to the angle defining the slope of a wedge-formed prism (i.e. the thick end of the prism) and the side parallel thereto (i.e. the thin end of the prism) are blackened to serve as absorption surfaces.

According to another aspect of the present invention, the pair of prisms is adapted to eliminate rays having an angle of incidence significantly different, i.e. larger than 5°, preferably larger than 10°, from the angle of incidence of rays originating from the picture projection optics and being deflected by the tilted mirror onto the pair of prisms.

Preferably, a ray having an angle of incidence with respect to the prism-entering air-prism border of more than 50° leads to is totally internally reflected within a prism whereby the ray is guided to a blackened side surface for absorption.

Another aspect of the present invention relates to head up display system, wherein the intermediate image plane is a diffusor screen.

According to another aspect of the present invention, the optical combiner comprises transparent glass, in particular a windshield of a motor vehicle or any other diffuse screen able to display the picture conveyed by the optical lens arrangement.

According to another aspect of the present invention, the optical combiner is arranged in the field of view of a user of the head up display, in particular a driver of a motor vehicle.

The invention further relates to a head up display system, in particular for a motor vehicle, comprising a picture generating unit for generating a picture on an image plane, and an optical lens arrangement for conveying a picture generated on the image plane to an optical combiner, wherein a pair of prisms is arranged in the optical path between the image plane and the optical combiner to eliminate or mitigate undesired light beams traveling from the optical combiner toward the image plane and/or undesired light beams reflected from the image plane and traveling back toward the optical combiner.

The advantages obtained by the pair of prisms arranged in the beam path between the tilted mirror and the intermediate image plane can also be obtained by placing the pair of prisms downstream of the intermediate image plane.

In particular, there are picture generating units which do not rely on Spatial Light Modulators, picture projection optics and tilted mirrors to generate a picture on the intermediate image plane.

Instead, the intermediate image plane is a display itself, like, e.g. a liquid crystal display, and the content displayed thereon only needs to be conveyed to the combiner via the optical lens arrangement.

In such a case, external light may be reflected by the surface of the display of the image plane and cause glare in the field of view of the driver of the vehicle. Even in this case, placing the pair of prisms in the optical path between the image plane and the combiner helps to mitigate glare induced by light from an external light source like the sun.

Preferably, the pair of prisms is inserted into the optical path directly behind the image plane, before the picture of the image is magnified or displaced by the optical lens arrangement.

DETAILED DESCRIPTION

Figure 1:
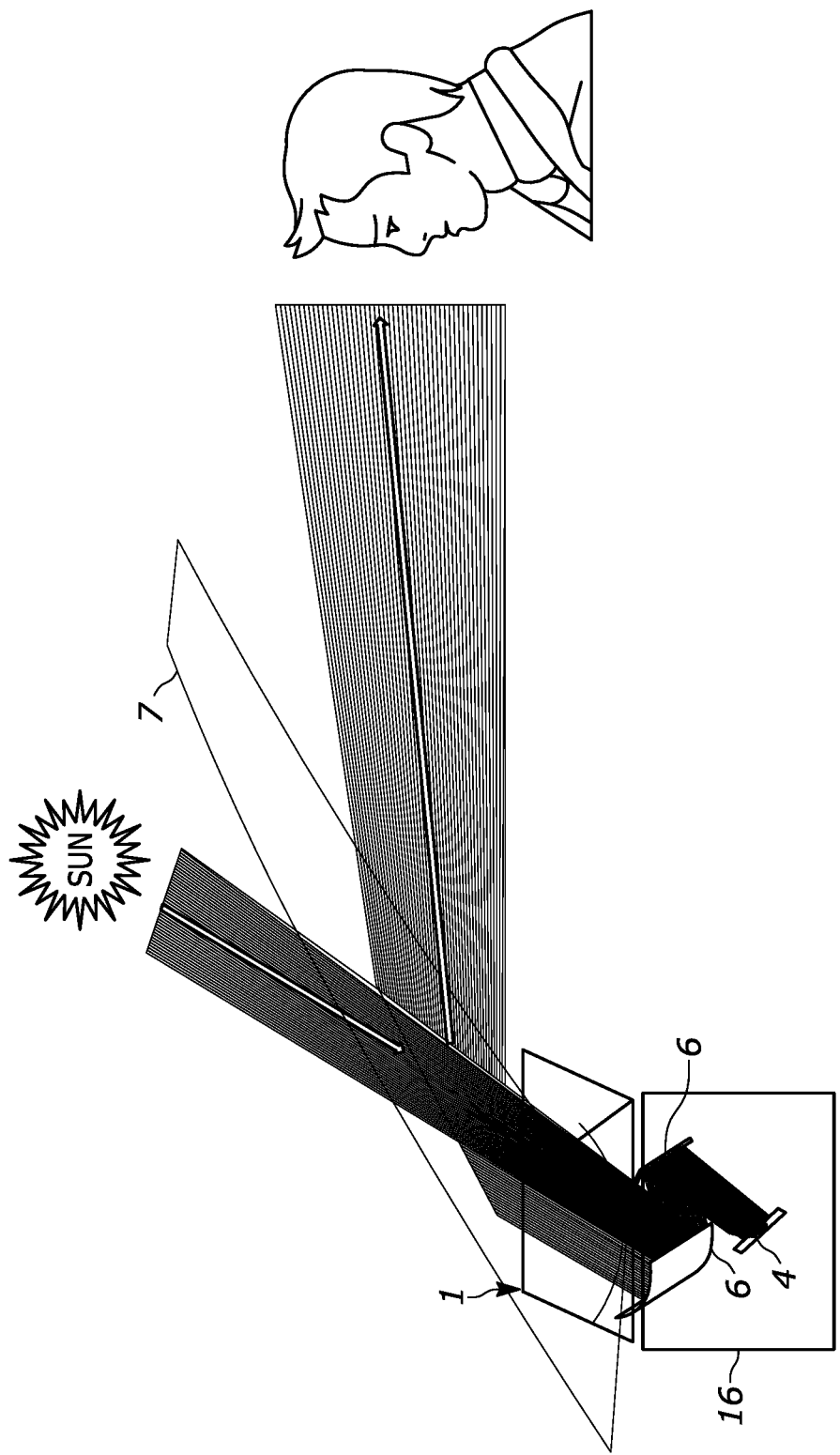
FIG. 1 depicts a side view of a situation in that glare arises due to the sun being at a specific orientation and sunlight entering the HUD system and getting reflected at the tilted mirror in the PGU.

FIG. 1 shows a side view of a situation in that glare arises due to the sun being at a specific orientation to generate glare in the driver's field of view.

Sunlight crosses the windshield 7 and enters the HUD system. Via the optical lens and/or mirror arrangement 6, the sunlight hits the diffuser screen 5, diffuses within the diffuser screen 5, hits the tilted mirror 4 in the PGU 2, is reflected back through the diffuser screen 5, and travels toward the driver's eye through the HUD Optics 6, and reflection by the windshield 7.

Figure 2:
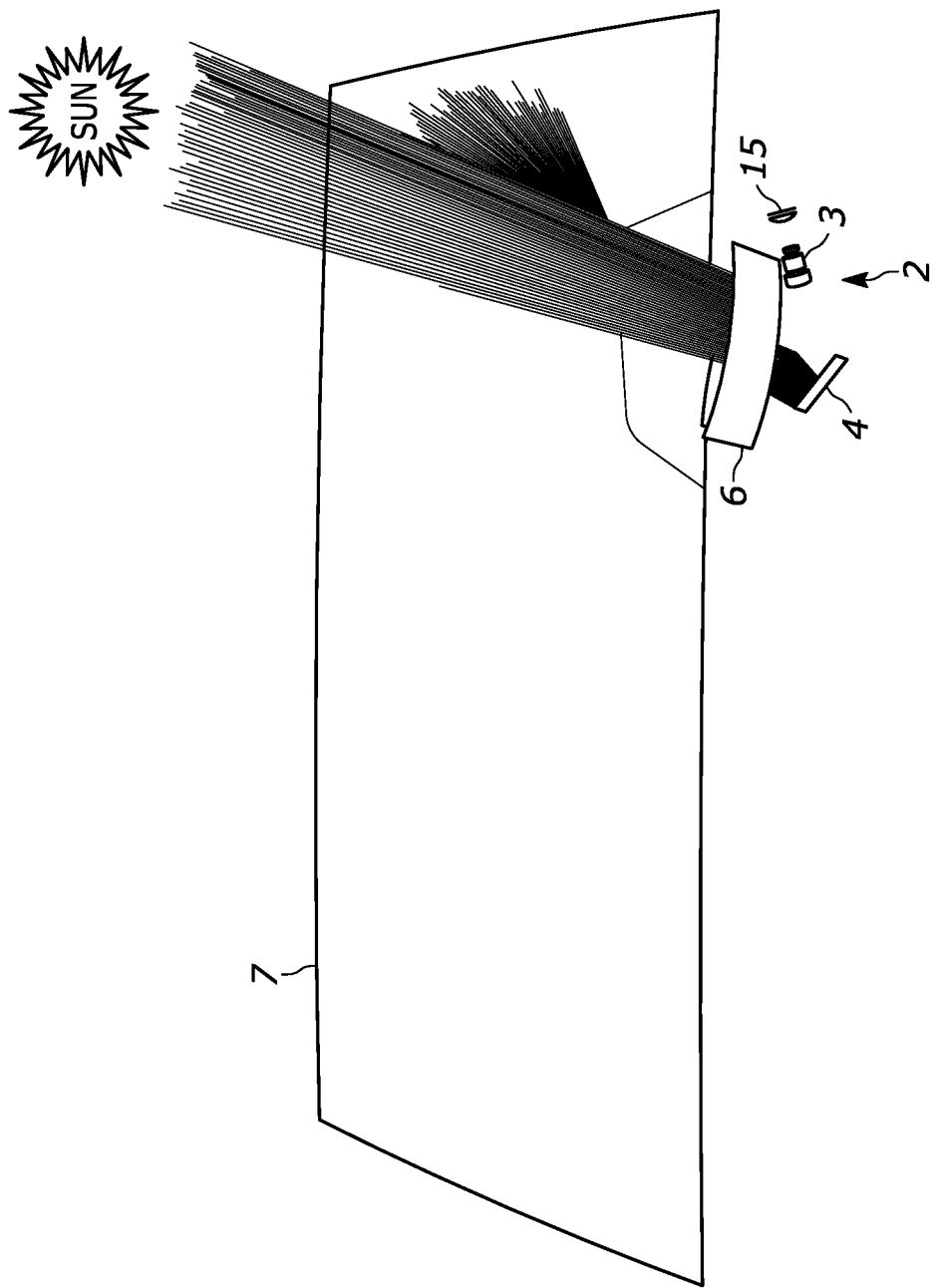
FIG. 2 depicts a front view of the situation from FIG. 1 in that glare arises due to the sun being at a specific orientation and sunlight entering the HUD system and getting reflected at the tilted mirror in the PGU.

FIG. 2 depicts a front view of the situation of FIG. 1. In addition to FIG. 1, in FIG. 2 the SLM 15, Spatial Light Modulator, and the picture projection optics 2 guiding the light to the backside of the intermediate image plane 5 via the tilted mirror 4, are shown.

Figure 3:
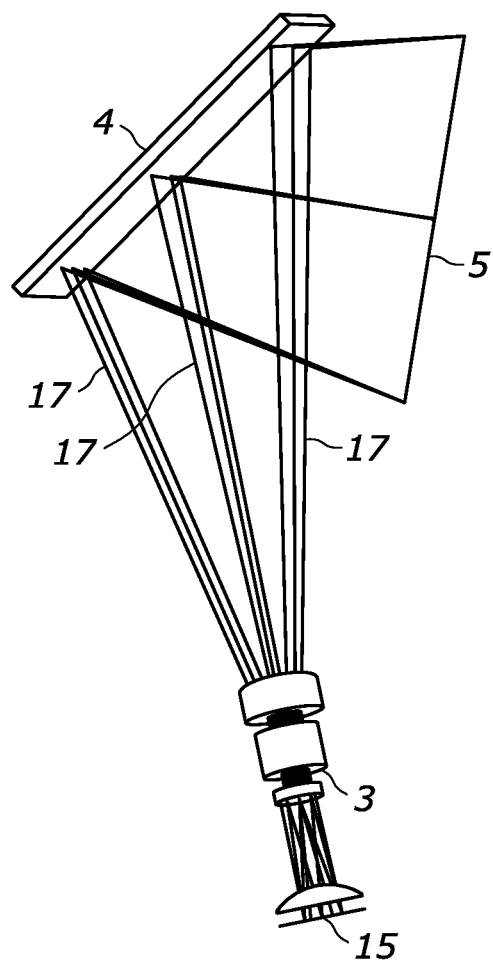
FIG. 3 depicts the details of the picture generation unit PGU with the desired light forming an intermediate image on the diffuser screen.

FIG. 3 shows the details of the picture generation unit 2, PGU, with the desired light forming an intermediate image on the diffuser screen 5.

The light beams 17 are modulated by the SLM 15, projected through the picture projection optics 3 and reflected by the tilted mirror 4 to form an intermediate image on the diffuser screen 5. When undesired sunlight reaches the diffuser screen 5, it diffuses therein and travels towards the mirror 4. The situation may arise that the mirror reflects parts of the sunlight back onto the diffuser screen 5 leading to glare in the view of the driver.

Figure 4A:
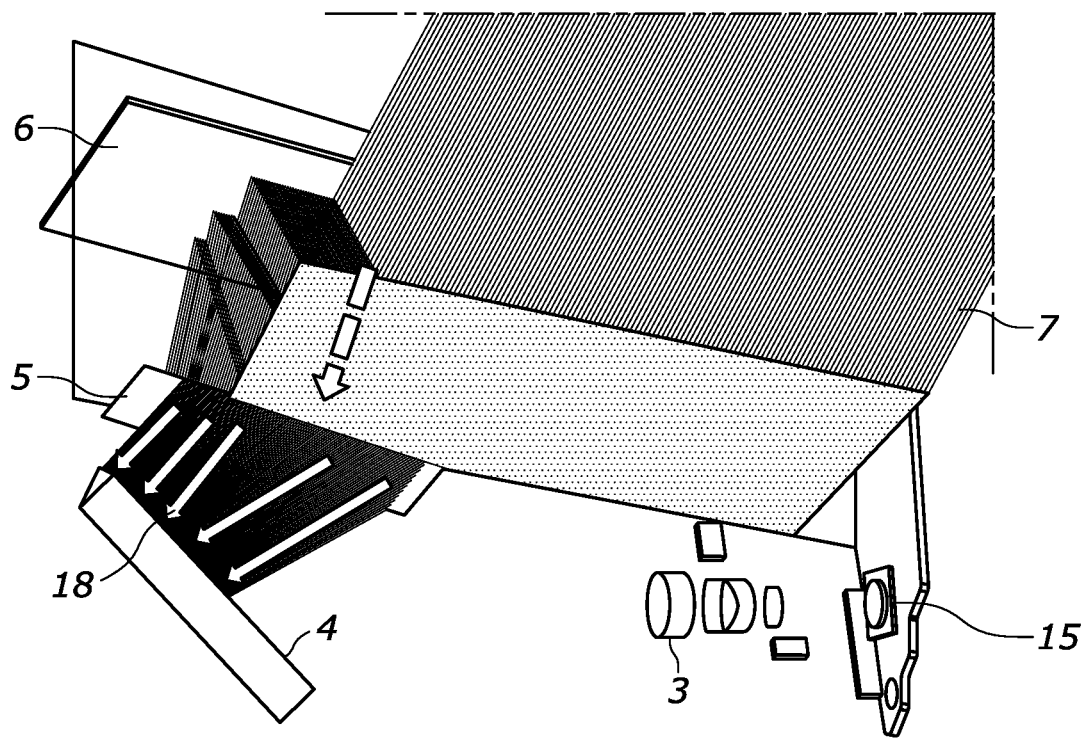
FIG. 4a depicts a top view of the picture projection unit PGU during the sunlight glare situation depicted in FIG. 1 and FIG. 2.

FIG. 4a shows a top view of the picture projection unit PGU 2 during the sunlight glare situation depicted in FIG. 1 and FIG. 2. The rays 18 of sunlight reach the tilted mirror 4 via the optical lens and/or the mirror arrangement 6 and the diffuser plane 5.

Figure 4B:
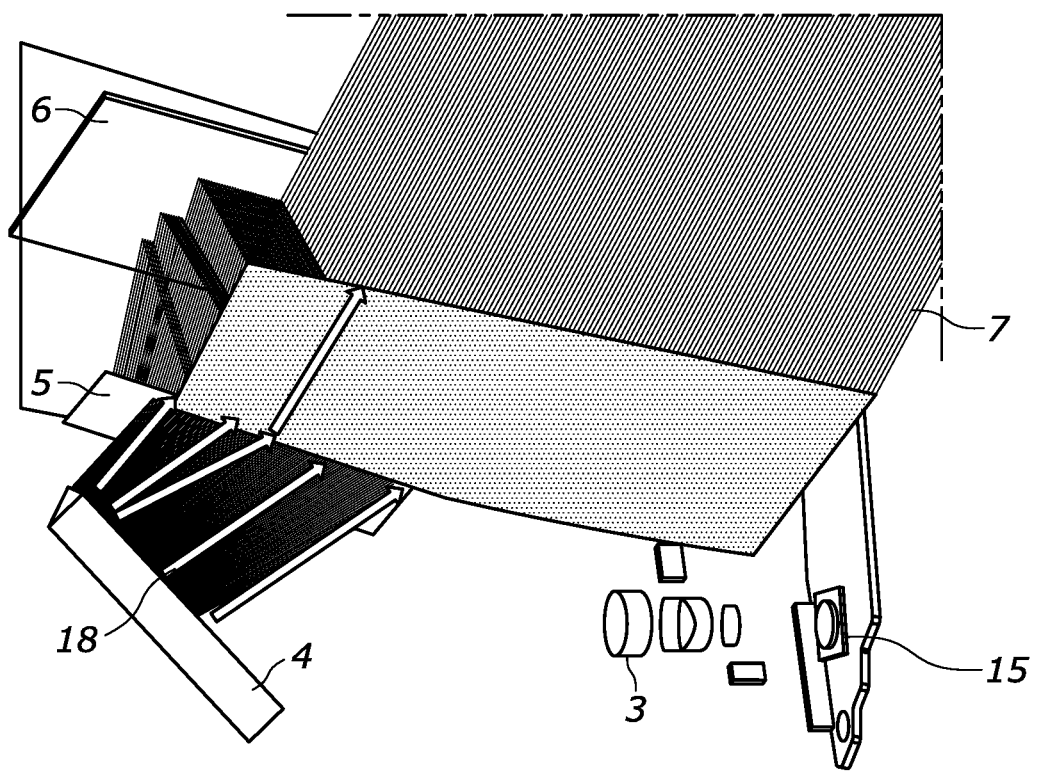
FIG. 4b depicts a top view of the picture projection unit PGU during the sunlight glare situation depicted in FIG. 1 and FIG. 2.

FIG. 4b shows the same top view of the picture projection unit PGU 2 during the sunlight glare situation as FIG. 4a, and indicates how the rays of sunlight 18 having reached the tilted mirror 4 are reflected back to the diffuser plane 5.

From there, the optical lens and/or mirror arrangement 6 guides these rays 18 to the windshield 7 and, finally, to the driver's eye.

Figure 5:
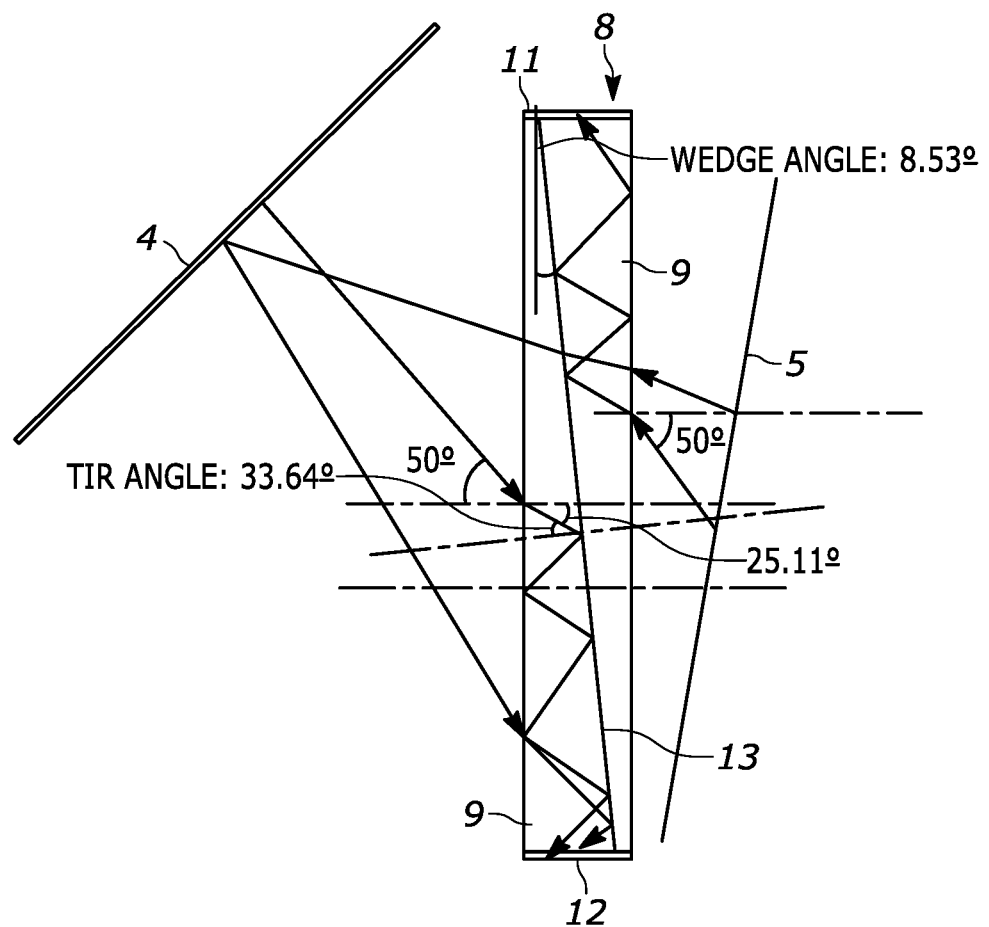
FIG. 5 depicts an embodiment of the invention with a TIR prism pair arranged between the diffuser screen and the tilted mirror and also illustrates the concept of total internal reflection.

FIG. 5 depicts one embodiment of the present invention with a TIR (Total Internal Reflection) prism pair 8 arranged between the diffuser screen 5 and the tilted mirror 4. FIG. 5 also illustrates the total internal reflection performed by the TIR prism pair 8.

The pair of prisms 8 is arranged in the optical beam path between the tilted mirror 4 of the PGU 2 and the intermediate image plane 5 (also: diffuser screen).

In this embodiment, each one of the prisms 9 forming pair of prisms 8 has the shape of a wedge, wherein the surfaces defining the thick end 12 and the thin end 11 are each blackened and are thus are adapted to absorb light.

The two wedge-shaped prisms 9 are aligned with each other in such a way that their sloping side surfaces face each other and their sides facing away from each other are aligned to be parallel to each other.

Further, there is an air gap 13 between the side surfaces facing each other which is preferably smaller than 0.2 mm. The air gap is preferably 0.1 mm wide.

Since the refractive index of the prisms is larger than the refractive index of the surrounding air, the effect of total internal reflection, TIR, may occur for any rays trying to travel out of a respective one of the prisms 9.

That means, once a ray has entered one of the prisms 9 it can leave the prism 9 only if the angle of incidence at the outgoing border of the prism 9 is below the so-called critical angle of the prism 9.

The critical angle depends on the refractive indexes of the prism 9 and the medium surrounding the prism, in the present case air. The refractive index of the prism 9 of the present embodiment is $n_d=1.8052$ and the refractive index of air is assumed to be 1.0. Thus, when applying the formula for determining the critical angle $\theta c$, $$\theta c = \arcsin(n_2/n_1), \text{ if } n_1 > n_2$$

total internal reflection occurs for rays having an angle of incidence greater than the critical angle of 33.64°. Rays with an angle of incidence larger that the critical angle do not leave the prism 9 but are guided to one of its side surfaces 11, 12 which are colored black for absorption.

Thus, light from an external light source, e.g. sunlight, having an angle of incidence greater than the critical angle and reaching the diffuser plane 5 is absorbed and removed by the prism pair 8 on its way to the tilted mirror 4.

Rays emanating from the diffuser plane 5 which do not leave the prism 9 due to an angle of incidence at the prism border larger than the critical angle are deflected towards one of the blackened side surfaces 11, 12. The same applies to rays having passed the pair of prisms 8 already once travelling from the diffuser plane 5 to the tilted mirror 4 and being reflected back to the diffuser plane 5 through the prism pair 8.

As a result, the vast majority of sunlight rays are absorbed when trying to pass the pair of prisms, whereby glare situations are avoided and the comfort of the driver is increased.

Figure 6:
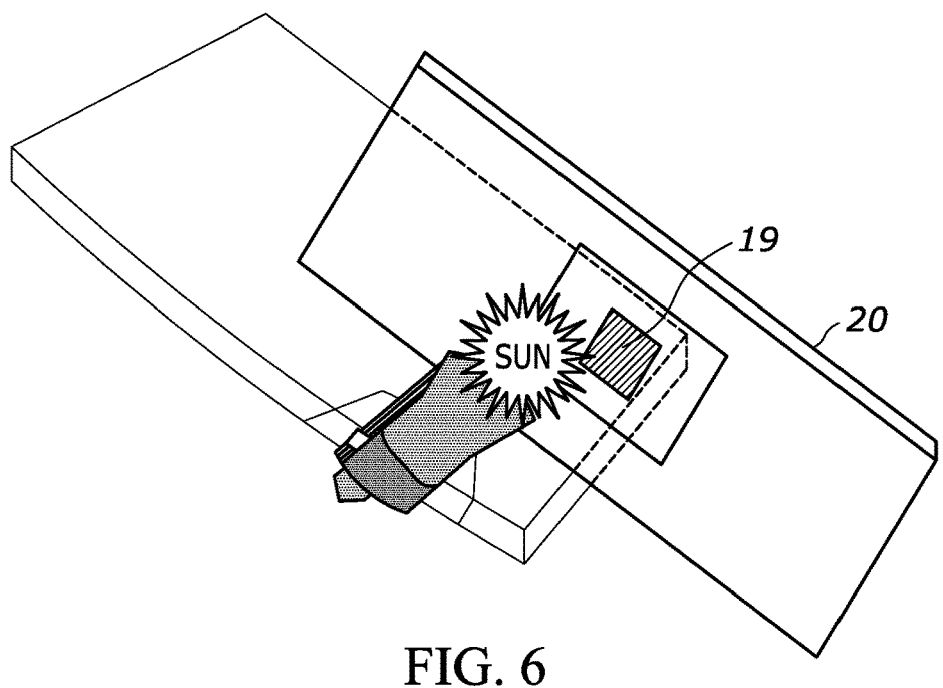
FIG. 6 depicts a maximum evaluation area in which the eyes of a driver are located during normal head motion which needs to be monitored for sun glare.

FIG. 6 depicts a maximum evaluation area in which the eyes of a driver are located during normal head motion which needs to be monitored for sun glare.

Installing a HUD system 1 into the dashboard of a vehicle normally requires a lot of simulation to safeguard against glare situations. In particular, glare situations should under no circumstances occur in the eye box area 19, where the driver's eyes are located during normal head motion and positioning.

However, in order to reliably avoid any glare situations, glare situations are preferably suppressed within the larger evaluation area 20.

The present invention facilitates the implementation of HUD systems 1 into a vehicle, since occurrence of glare situations is suppressed by the pair of prisms 9 in the optical beam path. The pair of prisms 9 can be configured in such a way to avoid glare from occurring even in the larger evaluation area 20.

Figure 7:
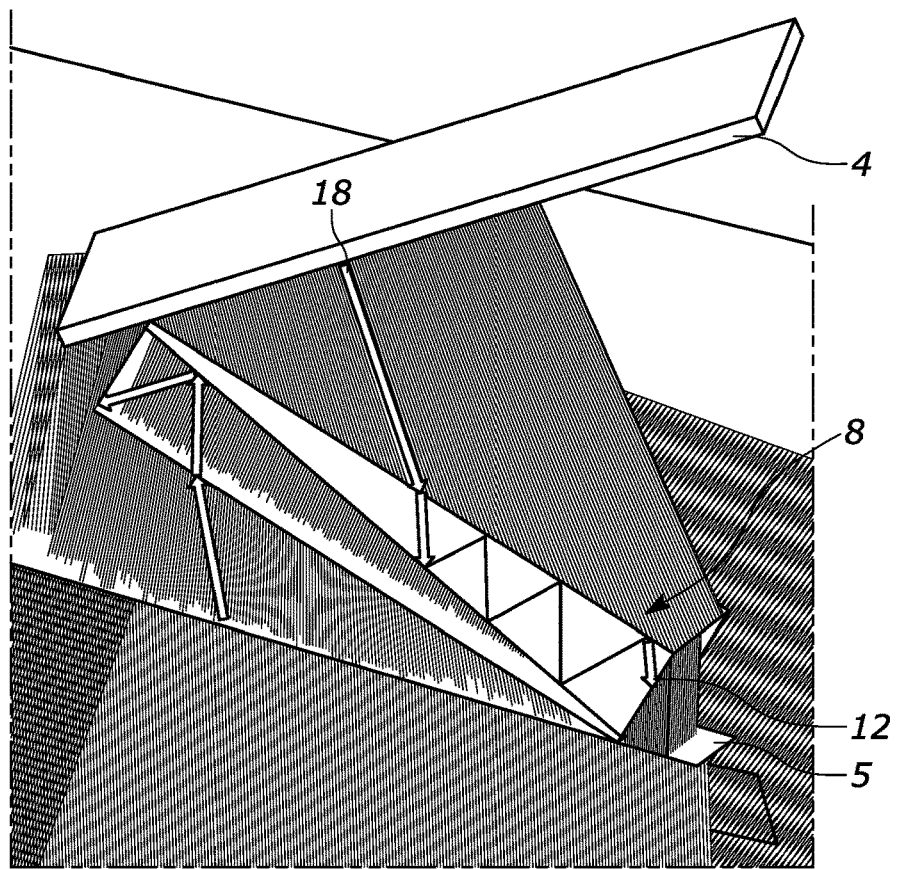
FIG. 7 depicts an embodiment of the invention comprising a TIR prism pair illustrating how sunlight causing glare in the HUD system is captured by the TIR prism pair and directed toward the absorption surface of the TIR prism pair.

FIG. 7 depicts an embodiment of the invention comprising the TIR prism pair and illustrates how sunlight causing glare in the HUD system 1 is being captured and directed towards the absorption surfaces 11, 12 of the TIR prism pair 9.

If the prism pair 8 is not provided, the sunlight enters the HUD system through the optical lens and/or mirror arrangement 6 to hit the diffuser screen 5, diffuses within the diffuser screen 5, hits the mirror 4, is reflected back to the diffuser screen 5 and finally reaches the driver's eye through the optical lens and/or mirror arrangement 6 and reflection by the windshield 7.

As shown in FIG. 7, the prism pair 8 is interposed in the beam path to absorb undesired light entering the HUD system from external sources by total internal reflection. The undesired light can enter the prism pair 8 from the side of the diffuser screen 5 or from side of the tilted mirror 4 to be absorbed by the prism pair 8.

While the present invention has been illustrated by a description of various embodiments and while these embodiments have been described in considerable detail, it is not the intention of the applicants to restrict or in any way limit the scope of the appended claims to such detail. Additional advantages and modifications will readily appear to those skilled in the art. The invention in its broader aspects is therefore not limited to the specific details, representative apparatus and method, and illustrative example shown and described. Accordingly, departures may be made from such details without departing from the spirit or scope of applicant's general inventive concept.

The invention claimed is:

1. A head up display system, in particular for a motor vehicle, comprising:
a picture generating unit having picture projection optics, a tilted mirror and an intermediate image plane, wherein light from the picture projection optics is deflected by the tilted mirror toward the backside of the intermediate image plane, and
an optical lens and/or mirror arrangement for magnifying and/or conveying a picture generated on the intermediate image plane to an optical combiner, and
a pair of prisms comprising a wedge-formed prism, wherein a surface side of the wedge-formed prism is blackened to absorb total internal reflection light, wherein the surface side is a side opposite to an angle defining a slope of the wedge-formed prism or a side parallel to the side opposite to the angle defining the slope of the wedge-formed prism, and wherein the pair of prisms are arranged in the optical path between the tilted mirror and the intermediate image plane to eliminate or mitigate undesired light beams emanating from the intermediate image plane and traveling toward the tilted mirror or undesired light beams emanating from the intermediate image plane being reflected from the tilted mirror and traveling back toward the intermediate image plane.

2. The head up display system of claim 1, wherein each one of the pair of prisms is a total internal reflection prism.

3. The head up display system of claim 1, wherein each one of the prisms is a triangular prism, a wedge-formed prism or a right angle prism.

4. The head up display system of claim 3, wherein the slanted surfaces of the pair of prisms are facing each other or wherein the thin end of a first one of the pair of prisms is located in proximity to the thick end of the second one of the pair of prims.

5. The head up display system of claim 3, wherein the surfaces of the two prisms facing each other are separated from another by an air gap smaller than 1 mm, preferably smaller than 0.2 mm or wherein the surfaces of the two prisms facing away from each other are arranged to be parallel.

6. The head up display system of claim 1, wherein the prisms of the pair of prisms are formed identical to each other.

7. The head up display system of claim 1, wherein the pair of prisms is adapted to eliminate rays having an angle of incidence significantly different, in particular larger than 5°, preferably larger than 10°, from an expected angle of incidence of rays originating from the picture projection optics and being deflected by the mirror onto the pair of prisms, wherein, in particular, a ray having an angle of incidence of more than 50° is totally internally reflected within a prism of the pair of prisms whereby the ray is guided to a blackened side surface of the prism for absorption.

8. The head up display system of claim 1, wherein the intermediate image plane is a diffusor screen.

9. The head up display system of claim 1, wherein the optical combiner comprises transparent glass, in particular a windshield of a motor vehicle or any other diffuse screen able to display the picture conveyed by the optical lens arrangement.

10. The head up display system of claim 9, wherein the optical combiner is arranged in the field of view of a user of the head up display, in particular a driver of a motor vehicle.

11. A head up display system, in particular for a motor vehicle, comprising:
a picture generating unit for generating a picture on an image plane, and
an optical lens arrangement for conveying a picture generated on the image plane to an optical combiner, and
a pair of prisms comprising a wedge-formed prism, wherein a surface side of the wedge-formed prism is blackened to absorb total internal reflection light, wherein the surface side is a side opposite to an angle defining a slope of the wedge-formed prism or a side parallel to the side opposite to the angle defining the slope of the wedge-formed prism, and wherein the pair of prisms are arranged in the optical path between the image plane and the optical combiner to eliminate or mitigate undesired light beams traveling from the optical combiner toward the image plane or undesired light beams reflected from the image plane and traveling back toward the optical combiner.

12. The head up display system of claim 11, wherein each one of the pair of prisms is a total internal reflection prism or wherein each one of the prisms is a triangular prism, a wedge-formed prism or a right angle prism.

13. The head up display system of claim 12, wherein the slanted surfaces of the pair of prisms are facing each other or wherein the thin end of a first prism of the pair of prisms is located in proximity to the thick end of a second prism of the pair of prims.

14. The head up display system of claim 12, wherein the surfaces of the two prisms facing each other are separated from another by an air gap smaller than 1 mm, preferably smaller than 0.2 mm or wherein the surfaces of the two prisms facing away from each other are arranged to be parallel.

15. The head up display system of claim 11, wherein the prisms of the pair of prisms are formed identical to each other.

16. The head up display system of claim 11, wherein the pair of prisms is adapted to eliminate rays having an angle of incidence significantly different, in particular larger than 5°, preferably larger than 10°, from an expected angle of incidence of rays originating from the picture projection optics and being deflected by the mirror onto the pair of prisms, wherein, in particular, a ray having an angle of incidence of more than 50° is totally internally reflected within a prism of the pair of prisms whereby the ray is guided to a blackened side surface of the prism for absorption.

17. The head up display system of claim 11, wherein the image plane is a diffusor screen.

18. The head up display system of claim 11, wherein the optical combiner comprises transparent glass, in particular a windshield of a motor vehicle or any other diffuse screen able to display the picture conveyed by the optical lens arrangement or wherein the optical combiner is arranged in the field of view of a user of the head up display, in particular a driver of a motor vehicle.

* * * * *